(12) United States Patent
Soo

(10) Patent No.: US 10,948,937 B2
(45) Date of Patent: Mar. 16, 2021

(54) SYSTEMS AND METHODS FOR CREATING LOAD PEAKS AND VALLEYS

(71) Applicant: PEAK POWER, INC., Toronto (CA)

(72) Inventor: Derek Lim Soo, Toronoto (CA)

(73) Assignee: PEAK POWER, INC., Toronto (CA)

( * ) Notice: Subject to any disclaimer, the term of this patent is extended or adjusted under 35 U.S.C. 154(b) by 663 days.

(21) Appl. No.: 15/264,414

(22) Filed: Sep. 13, 2016

(65) Prior Publication Data

US 2017/0083037 A1    Mar. 23, 2017

Related U.S. Application Data

(60) Provisional application No. 62/221,376, filed on Sep. 21, 2015.

(51) Int. Cl.
G05F 1/66 (2006.01)
G05B 15/02 (2006.01)

(52) U.S. Cl.
CPC ............ G05F 1/66 (2013.01); G05B 15/02 (2013.01); G05B 2219/25011 (2013.01)

(58) Field of Classification Search
None
See application file for complete search history.

(56) References Cited

U.S. PATENT DOCUMENTS

| | | | |
|---|---|---|---|
| 6,400,996 B1 | 6/2002 | Hoffberg et al. | |
| 2005/0234600 A1* | 10/2005 | Boucher | G06Q 50/06 700/286 |
| 2013/0134780 A1* | 5/2013 | Parsonnet | H02J 3/005 307/25 |
| 2013/0146587 A1* | 6/2013 | McDonald | G05D 23/1923 219/494 |
| 2014/0266669 A1 | 9/2014 | Fadell et al. | |

FOREIGN PATENT DOCUMENTS

WO    2014172374 A1    10/2014

OTHER PUBLICATIONS

International Search Report and Written Opinion for Application No. PCT/CA2016/051098 filed Sep. 19, 2016, and dated from the International Searching Authority on Jan. 25, 2017, 13 pgs.

\* cited by examiner

Primary Examiner — Mohammad Ali
Assistant Examiner — Saad M Kabir
(74) Attorney, Agent, or Firm — Stoel Rives LLP

(57) ABSTRACT

The present disclosure provides systems and methods for shaping the load of a building for more efficient sizing and/or economics of an energy storage and/or microgrid system. Shaping the load of a building can include identifying a plurality of core hours of a time period increasing a load of the building, a plurality of different increase instances, by interfacing with a BAS and an ESS during the plurality of core hours, and decreasing the load of the building, a plurality of different decrease instances, by interfacing with the BAS and the ESS during the plurality of core hours, wherein each increase instance from the plurality of different increase instances of the load profile is followed by a decrease instance from the plurality of decrease instances of the load profile.

17 Claims, 9 Drawing Sheets

SYSTEMS AND METHODS FOR CREATING LOAD PEAKS AND VALLEYS

RELATED APPLICATIONS

This application claims the benefit of Patent Application No. 62/221,376, filed Sep. 21, 2015, which is incorporated by reference herein in its entirety.

TECHNICAL FIELD

The present disclosure relates to shaping the load profile of a building. In particular, the present disclosure relates to shaping the load profile of a building to include a plurality of peaks for more efficient sizing and/or economics of an energy storage and/or microgrid system.

BACKGROUND

The energy consumption of a building can be reduced to improve cost savings and energy consumption. The energy consumptions of a building can be reduced using a building management system (BMS). The BMS can control and/or monitor a building's mechanical and/or electrical equipment including ventilation, lights, power systems, fire systems, and/or security systems to reduce the energy consumption of the building.

DETAILED DESCRIPTION OF PREFERRED EMBODIMENTS

Figure 1:
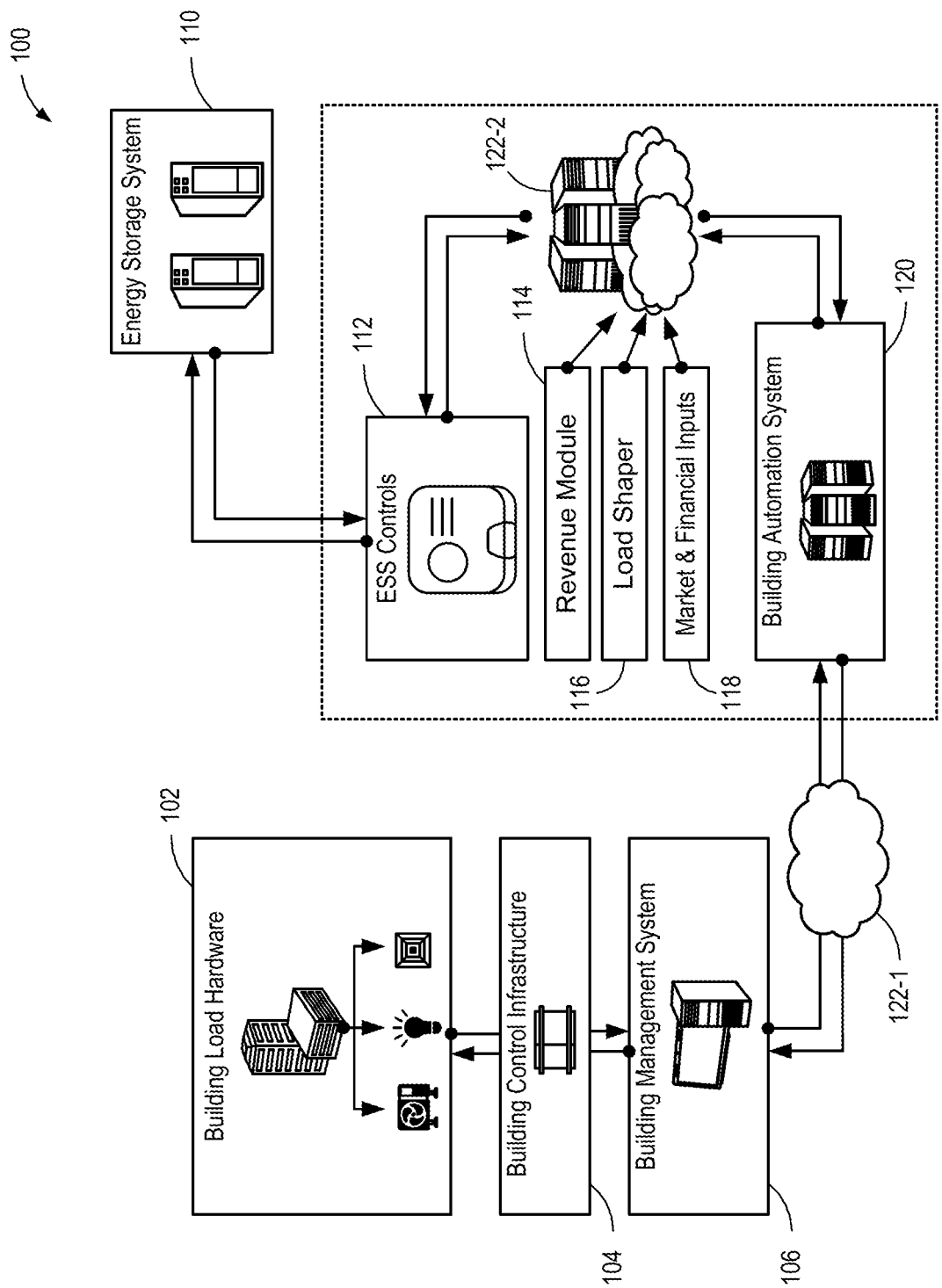
FIG. 1 is a system diagram for shaping the load profile of a building according to one embodiment.

A large cost of an energy storage system situated in a building is the battery. The battery for a building can be selected based, in part, on the load profile of the building. The size of a battery can be reduced by reducing the energy consumption of a building and/or re-shaping the load profile of the building.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a system 100 diagram for shaping the load profile of a building according to one embodiment. The system 100 includes building load hardware 102, a building control infrastructure 104, a building management system 106, an energy storage system (ESS) 110, ESS controls 112, a revenue module 114, a load shaper 116, a market and financial inputs 118, a building automation system (BAS) 120, and networks 122-1 and 122-2.

As used herein, each of the building load hardware 102, the building control infrastructure 104, the building management system 106, the ESS 110, the ESS controls 112, the revenue module 114, the load shaper 116, the market and financial inputs 118, the BAS 120, and/or the network 122 can be implemented as modules and/or engines. As used herein, a module can include computer executable instructions (e.g., software). An engine can include computer hardware and/or software. For example, an engine can include dedicated hardware and/or multipurpose hardware.

Buildings can be managed via the building management system 106. For example, the building management system 106 can manage HVAC equipment (e.g., building load hardware 102) by interfacing with a Java Application Control Engine (JACE). In a number of examples, the energy load of a building can be shaped through the use of the building management system 106 to create a load profile that is optimized for the sizing and performance of the ESS 110. The load profile of a building can be shaped by interfacing with the BAS 120 and/or the ESS 110.

A building can include the building load hardware 102. The building load hardware 102 can include, for example, mechanical and/or electrical equipment including ventilation, lights, power systems, fire systems, and/or security systems, among other types of mechanical and/or electrical equipment. In some examples, the building load hardware 102 can include hardware and/or computer executable instructions associated with the mechanical and/or electrical equipment. In some examples, the hardware and/or the computer executable instructions can comprise one or more computing devices. The hardware can include, for example, one or more processing units, memory, and/or computer-readable storage mediums. A computing device is further described below.

The building control infrastructure 104 can be used to interface with the building load hardware 102. The building control infrastructure 104 can include hardware and/or computer executable instructions. The building control infrastructure 104 can be, for example, a JACE. The building control infrastructure 104 can be used to set one or more values for the building load hardware 102. The one or more values can include an active value, an inactive value, and/or an incremental value, among other examples of values. The building control infrastructure 104 can also set one or more parameters of the building load hardware 102. For example, the building control infrastructure 104 can control when the active value is implemented for the building load hardware 102.

The building management system 106 can include hardware and/or computer executable instructions. The building management system 106 can provide an interface to the building control infrastructure 104. The building management system 106 can control and manage the building load hardware 102 through the building control infrastructure 104. The building management system 106 can comprise an access point to monitor and control the building load hardware 102.

The BAS 120 can interface with the building management system 106 to automate control of the building load hardware 102 for increased efficiency. The BAS 120 can export building equipment data (e.g., data associated with the building load hardware 102) and meter data. The BAS 120 can also utilize weather data and building occupancy data. The data collected by the BAS 120 can be stored in memory. The memory can be part of a cloud system and/or a local computing device memory. The memory can be used to store the contents of a database and/or a different data storage system.

The data collected by the BAS 120 can be analyzed and a building energy load forecast can be prepared. The BAS 120 can have a series of conservation strategies such as reduce simultaneous heating and cooling, modify fresh air mix, set point ramping, and/or predictive demand management, among other types of conservation strategies. In some examples, the conservation strategies can be built into an operating system of the BAS 120.

The BAS 120 can implement the conservation strategies by controlling the building load hardware 102. For example, the BAS 120 can set the speed of variable speed fans or/or the lumen output of dimmable lights. The BAS 120 can also activate HVAC equipment before it is needed to pre-cool/heat an area of the building.

The BAS 120 can execute the conservation strategies and control the building load hardware 102 while maintaining the building within a set of operating conditions, for occupant comfort. In some examples, the building management system 106, without the use of the BAS 120, can take the shortest path from setpoint A to B regardless of how much energy is spent getting there. The BAS 120 can take a more efficient route in getting from setpoint A to B by taking into consideration operational constraints, energy constraints, and/or timing constraints.

In some examples, the BAS 120 can be coupled to the building management system 106 via a network 122-1. The BAS 120 can also be coupled to the revenue module 114, the load shaper 116, the market and financial inputs 118, and/or the ESS controls 112 via the network 122-2.

As used herein, the networks 122-1 and/or 122-2 can include a worldwide network and/or a local area network. The networks 122-1 and/or 122-2 can be wireless networks and/or networks physically coupling network components. The network 122-2 comprises a network implementing network components via a cloud. For example, each of the revenue module 114, the load shaper 116, the market and financial inputs 118, the ESS controls 112, and/or the BAS 120 can be implemented in a cloud environment.

A cloud environment (e.g., the network 122-2) can include shared computer resources and/or data that are available on demand. The network 122-2 can be local to the building and/or external to the building. That is, the network 122-2 can be hosted outside the perimeters of the building.

In number of examples, the revenue module 114 and the market and financial inputs 118 can provide a number of constraints to the BAS 120. The market and financial inputs 118 can represent real time energy prices. The revenue module 114 can, for example, provide a plurality of cost constraints. For example, the revenue module 114 can describe cost limits for the execution of the building load hardware 102 based on the market and financial inputs 118. The revenue module 114 can further provide calculations and instructions (e.g., machine-readable instructions) based on the inputs. That is, the revenue module 114 can also provide other price and/or cost constraints to the BAS 120.

The ESS controls 112 can provide a plurality of instruments to control the ESS 110. For example, the ESS controls 112 can comprise physical and/or electronic instruments for controlling the ESS 110.

The ESS 110 can comprise a battery, an inverter, and/or a control system. The control system can include the ESS controls 112 and/or controls local to the computing device hosting at least a portion of the ESS 110. In a number of examples the battery can be referred to as a storage device. The terms "battery" and "storage device" can include a plurality of types of storage devices suitable for providing power to a building.

The control system can communicate with the battery to cause the battery to charge and/or discharge. The control system can specify which hours to charge the battery and which hours to discharge the battery. The control system can also be configured to charge/discharge the battery based on a revenue module 114, the market and financial inputs 118, and/or the load shaper 116 to obtain the greatest financial benefit from multiple revenue streams (e.g., peak shaving, demand response, etc.).

The ESS 110 can be logically behind a meter of a building. That is, the ESS 110 and/or the ESS controls 112 can be associated with a forecast of the energy load of the building. The forecast can be provided by the BAS 120 or independently from the BAS 120. The forecast can predict when building energy loads are likely to be at their peak, which forms a substantial part of their energy bill. The ESS controls 112 can instruct the battery to discharge at the appropriate moments to shave off the peak of a load profile, thereby reducing the maximum draw (e.g., kilowatt (kW)) and lowering the energy bill of the building.

The load shaper 116 can include hardware and/or computer executable instructions to shape the load profile of a building. Without the load shaper 116 the ESS 110 can discharge at a time necessary to shave the peak. The inverter of the ESS 110 can be sized based on the desired kW reduction. The battery can be sized based on the amount of energy to be displaced. Batteries are an expense component to the ESS 110.

Figure 2:
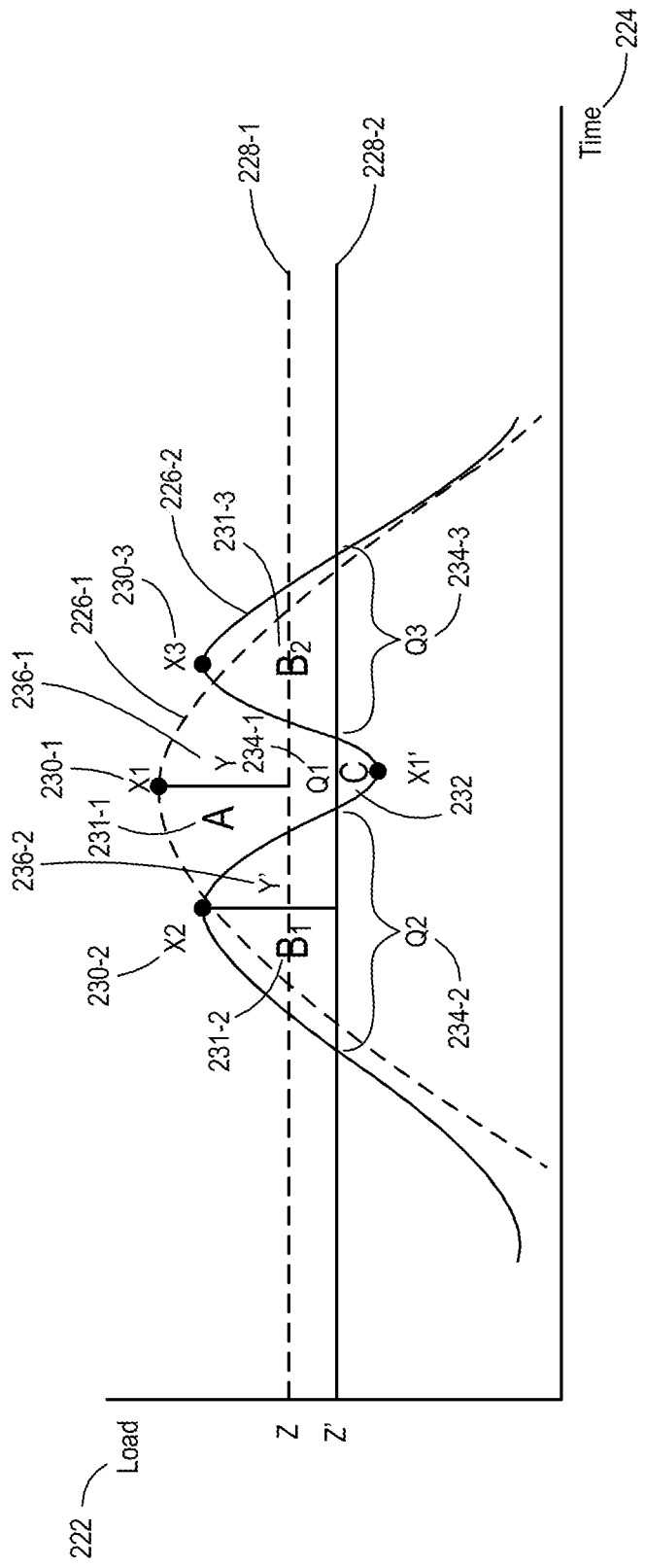
FIG. 2 is a diagram of a plurality of load profiles according to one embodiment.

Differently sized batteries can be used to support different load profiles of a building. As such, eliminating a narrow peak of a load profile requires a smaller and less expensive battery than eliminating a wide peak of a load profile. In some examples, the BAS 120 can be configured, via inputs from the load shaper 116, to shape the load profile to transition from a single wider peak to multiple narrower peaks, thereby reducing the size of the battery used to support the load profile including the multiple peaks. As used herein, the terms a narrow peak (e.g., narrower peak) and a wide peak (e.g., wider peak) can be relative. That is, a first peak can be narrower than a second peak and the second peak can be wider than the first peak. FIG. 2 provides an example of a narrower peaks X2 and X3 and a wider peak X1. That is, FIG. 2 provides an example of two peaks X2 and X3 that are narrower (e.g., Q2 and Q3) than a peak X1. The peak X1 is also wider (Q1) than the two peaks X2 and X3.

The load shaper 116 can provide a number of conditions/constraints that can be utilized by the BAS 120 to generate the load profile of a building. The load profile can be used by the BAS 120 and/or the ESS 110 to determine when to charge and/or discharge one or more batteries of the ESS 110.

Although the examples provided herein are in the context of energy storage, the examples provided herein can also be applied to a microgrid system. That is, the microgrid system can be configured to provide power based on a load profile generated as described herein.

FIG. 2 is a diagram of a plurality of load profiles 226-1 and 226-2 according to one embodiment. The load profiles 226-1 and 226-2 can be referred to as load profiles 226. The load profiles 226 can be defined by a load 222 on the building and by time 224.

The load profiles 226 can be forecast load profiles and/or load profiles of the actual load on a building. For example, the load profile 226-1 can be a forecast load profile and the load profile 226-1 can be an actual load profile of a building. In FIG. 2, the load profile 226-2 is generated by the BAS 120 in FIG. 1 subject to a number of conditions provided by at least the load shaper 116 in FIG. 1. The load profile 226-1 is generated by the BAS 120 without implementing the number of conditions provided by the load shaper 116.

Each of the load profiles 226 can be described by identifying a number of peaks associated with each of the load profiles 226. For example, the load profile 226-1 can include a peak 230-1 while the load profile 226-2 can include the peaks 230-2 and 230-3. The peaks 230-1, 230-2, and/or 230-3 can be referred to as peaks 230.

FIG. 2 also shows shelf levels 228-1 and 228-2 (e.g., Z and Z') that identify a point on the load at which the ESS can initiate a discharge and/or a charge of the associated battery. A discharge of a storage device can describe the transfer of energy from the storage device to the building load hardware to support a load on the building. A charge of a storage device can describe the transfer of energy from a source to the storage device for storage.

The peaks 230 can be described by a width and a peak point. For example, the peak 230-1 can include a peak point X1. The peak 230-2 can include a peak point X2. The peak 230-3 can include the peak point X3. The peak point can describe a highest load of the associated peak.

The widths of the peaks 230 are represented by Q1 234-1, Q2 234-2, and Q3 234-3. For example, the peak 230-1 can have a width of Q1 234-1, the peak 230-2 can have a width of Q2 234-2, and the peak 230-3 can have a width of Q3 234-3. The widths can be described in relation to the shelf lives 228-1 and 228-2. For example, the Q1 234-1 marks the distance between points at which the peak 230-1 intercepts the shelf level 228-1. The Q2 234-2 marks the distance between points at which the peak 230-2 intercepts the shelf level 228-2. The Q3 234-3 marks the distance between points at which the peak 230-3 intercepts the shelf level 228-2.

The shelf levels 228-1, 228-2, and 228-3 can be referred to as shelf levels 228. The shelf levels 228 can also be used to define an inverter size used to support the associated load profile. An inverter size 236-1 for the load profile 226-1 is represented as Y. An inverter size 236-2 for the load profile 226-2 is represented as Y'.

The Y 226-1 can be described as the distance between the peak point X1 and the shelf level 228-1. The Y' 226-2 can be described as the distance between the peak point X2 and the shelf level 228-1. In some examples, the Y' 226-2 and the Y 226-1 can be equal to each other.

The shelf levels 228 can be used to describe discharge potentials 231-1, 231-2, and 231-3 (e.g., A, B1, and B2, respectively). For example, the discharge potential 231-1 (e.g., A) can be defined by the area between the peak 230-1 and the shelf level 228-1. The discharge potential 231-2 (e.g., B1) can be defined by the area between the peak 230-2 and the shelf level 228-2. The discharge potential 231-3 (e.g., B2) can be defined by the area between the peak 230-3 and the shelf level 228-2. A discharge potential is defined as a potential of energy that a storage device stores to be discharged to support the load on a building.

The shelf level 228-2 can also be used to describe a recharge potential 232 (e.g., C). For example, the recharge potential 232 can be defined by the area between the peaks 230-2 and 230-3 below the shelf level 228-2 and the shelf level 228-2. The recharge potential 232 can describe the potential of energy that can be stored in a storage device for a given time period.

In some examples, the peaks 230-2 and 230-3 can be shaped similarly or the peaks 230-2 and 230-3 can be shaped differently. For example, the peak points for the peaks 230-2 and 230-3 can be at a same load value. The widths 234-2 and 234-3 of the peaks 230-2 and 230-3 can be equal. The discharge potentials 231-2 and 231-3 can be equal. The shapes of the peaks 230-2 and 230-3 can be a same shape. In other examples, the peak points X2 and X3 can be at different load values, the widths 234-2 and 234-3 can be different, the discharge potentials 231-2 and 231-3 can be different, and/or the shapes of the peaks 230-2 and 230-3 can be different.

In some examples, the point X1' can share a time value with the peak point X1. Also, the point X1' can be the lowest point between the peaks 230-2 and 230-3. As such, the point X1' can be referred to as a valley. Although FIG. 2 shows two peaks and a single valley, a number of examples may contain more than the two peaks and/or valleys. For examples, some examples can contain three, four, or five peaks, among other possible peak numbers that can be used. Utilizing the number of conditions provided by at least the load shaper to shape the load profile 226-2 can result in a lower discharge potential for the load profile 226-2 (e.g., the discharge potential 231-2 plus the discharge potential 231-3 minus the recharge potential 232) as compared to the discharge potential 231-1 for the load profile 226-1. Lowering the discharge potential associated with a load profile can result in the utilization of a smaller storage device to support the load on a building than utilizing the load profile with an original discharge potential. The original discharge potential can describe a discharge potential of a load profile before a number of conditions provided by the load shaper are used to shape the load profile. The number of conditions provided by the load shaper is further described in FIG. 3.

Figure 3:
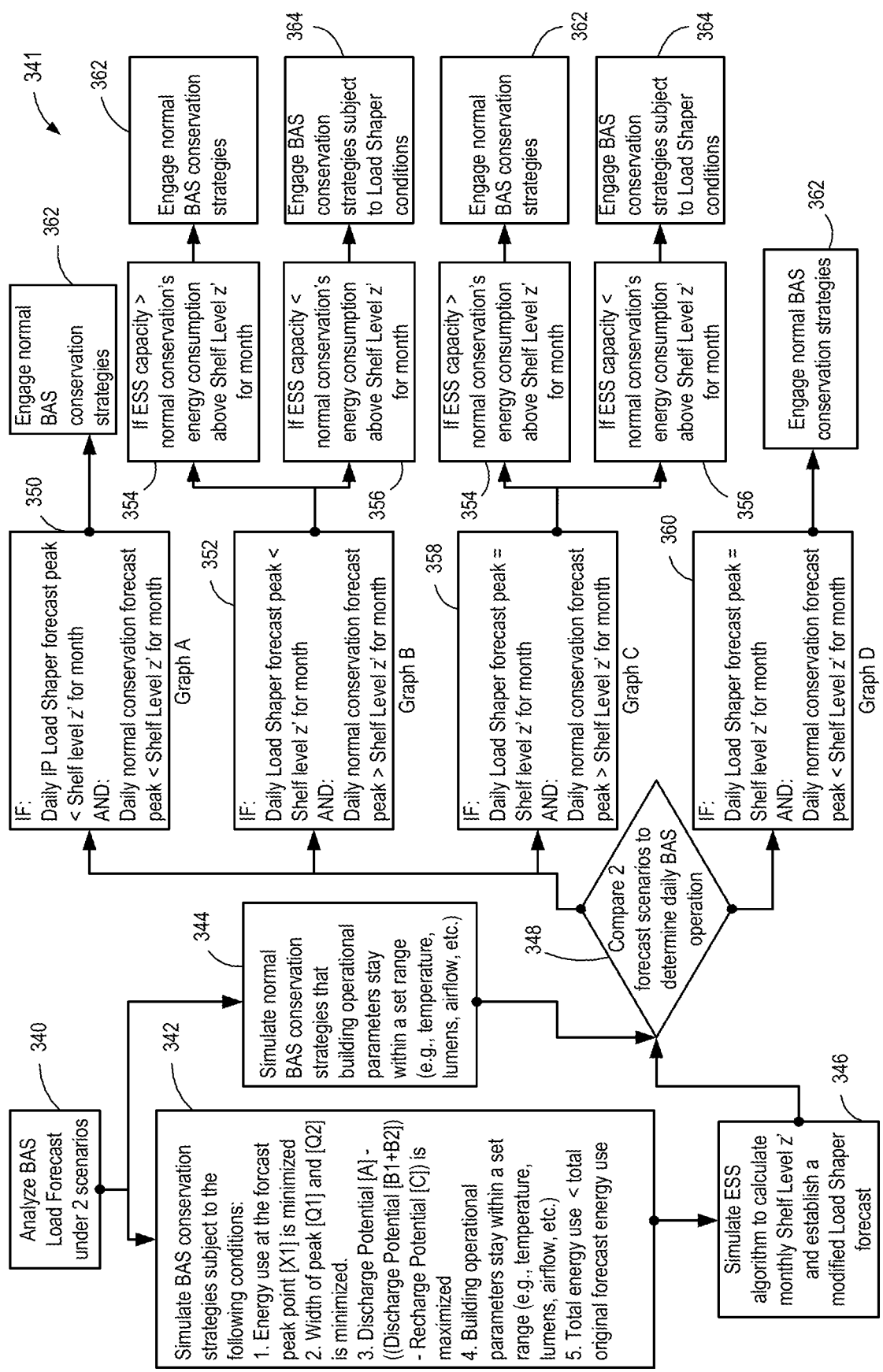
FIG. 3 is a flowchart of a load shaper according to one embodiment.

FIG. 3 is a flowchart 341 of a load shaper according to one embodiment. The flow chart 341 can include analyzing 340 a BAS load forecast under two different scenarios.

A first BAS load forecast 344 can be implemented utilizing conservation strategies that are not subject to a plurality of conditions provided by a load shaper. The first BAS load forecast 344 can correspond to the load profile 226-1 in FIG. 2. In some examples, the first BAS load forecast 344 can share some of the conditions implemented by a second BAS load forecast 342. For example, the first BAS load forecast 344 can be simulated to maintain the building operation parameters within a set range.

The second BAS load forecast 342 can be implemented utilizing conservation strategies subject to a plurality of conditions provided by a load shaper. Although five conditions provided by the load shaper are shown in FIG. 3, some examples can be implemented to create the second BAS load forecast 342 utilizing at least one of the five conditions provided by the load shaper. The second BAS load forecast 342 can be analogous to the load profile 226-2 in FIG. 2. Reference will be made to FIG. 2 in describing the number of conditions.

The number of conditions can also be referred to as operations. For example, the first condition can include a minimizing operation. The first condition can include minimizing the energy used at the forecast peak point X1 of the first BAS load forecast 344. The example of FIG. 3 shows the minimizing of the energy used at a same time as the forecast peak point X1 as point X1' of the second BAS load forecast 342. That is, the first condition can provide that the lowest point in a second BAS load forecast 342 (e.g., second load profile) between a first peak and a last peak can occur at a same time coordinate as the time coordinate of the forecast peak point X1 of the first BAS load forecast 344.

The second condition can also include a minimize operation. The second condition can include minimizing the widths Q2 and Q3 of the peaks of the second BAS load forecast 342 (e.g., second load profile). In some example, the minimize condition can be fulfilled by configuring the widths Q2 and Q3 such that they are smaller than the width Q1 of a forecast peak of the first BAS load forecast 344 created without implementing the conditions provided by the load shaper. The minimize condition referenced in the second condition can be considered in conjunction with the first condition in implementing the second BAS load forecast 342.

The third condition can be a maximize operation. That is, the third condition can maximize the difference between a dispatch potential of the second BAS load forecast 342 and the first BAS load forecast 344. That is, the third condition can maximize A−((B1+B2)−C), where the discharge and charge potentials are represented as absolute numbers.

The fourth condition can maintain a set of building operational parameters within a set range. The building operational parameters can include, for example, a temperature, lumens, and airflow, among other examples of building operational parameters.

The fifth condition can be a less than operation. The fifth condition can configure the total energy used by the second BAS load forecast 342 to be less than the total energy used by the first BAS load forecast 344.

As used herein, the use of first and second in the first BAS load forecast 344 and the second BAS load forecast 342 does not indicate order. For example, the first BAS load forecast 344 can be created before or after the second BAS load forecast 342. In the course of describing the first BAS load forecast 344 reference is made to a forecast peak point X1 and/or total original forecast energy used. The references can refer to a load profile performed in the course of creating the second BAS load forecast 342 and/or a different load forecast. For example, the load profile (e.g., load forecast) referenced in the first BAS load forecast 344 can include a previously used load profile, a monthly load profile, and/or a forecast created in the course of creating the first BAS load forecast 344 that is different from the second BAS load forecast 342.

The flowchart 341 can also include calculating 346 a monthly shelf level Z' and establishing a modified second BAS load forecast 342 using the second BAS load forecast 342. As used herein, the first BAS load forecast 344, the second BAS load forecast 342, and the modified second BAS load forecast 342 are simulations generated using at least one computing device. The simulations describes a potential state of the ESS if the ESS operated according to the load profile associated with the simulations.

The flow chart 341 can also include comparing 348 the first BAS load forecast 344 and the modified second BAS load forecast 342 to determine a daily BAS operation. That is, the two BAS load forecasts can be compared to determine which forecast to use to shape the load profile of a building.

Determining which BAS load forecast to utilize to shape the load of a building can include determining 350 if the peak point for the modified second BAS load forecast 342 is less than a shelf level Z' for the month and determining 350 if the peak point for the first BAS load forecast 344 is less than the shelf level Z' for the month. If the peak point for the modified second BAS load forecast 342 is less than a shelf level Z' for the month and the peak point for the first BAS load forecast 344 is less than the shelf level Z' for the month, then the first BAS load forecast 344 can be engaged 362 to shape the load profile of a building.

Determining which BAS load forecast to utilize to shape the load of a building can include determining 352 if the peak point for the modified second BAS load forecast 342 is less than a shelf level Z' for the month and determining 352 if the peak point for the first BAS load forecast 344 is greater than the shelf level Z' for the month. If the peak point for the modified second BAS load forecast 342 is less than a shelf level Z' for the month and the peak point for the first BAS load forecast 344 is greater than the shelf level Z' for the month, then the flowchart 341 can include determining 354 if the ESS capacity is greater than the energy consumption for the first BAS load forecast 344 above the shelf level Z' for the month. If the ESS capacity is greater than the energy consumption for the first BAS load forecast 344 above the shelf level Z' for the month, then the first BAS load forecast 344 can be engaged 362 to shape the load profile of the building.

If the peak point for the modified second BAS load forecast 342 is less than a shelf level Z' for the month and the peak point for the first BAS load forecast 344 is greater than the shelf level Z' for the month, then the flowchart 341 can include determining 356 if the ESS capacity is less than the energy consumption for the first BAS load forecast 344 above the shelf level Z' for the month. If the ESS capacity is greater than the energy consumption for the first BAS load forecast 344 above the shelf level Z', then the second BAS load forecast 342 can be engaged 364 to shape the load profile of the building.

Determining which BAS load forecast to utilize to shape the load of a building can include determining 358 if the peak point for the modified second BAS load forecast 342 is equal to a shelf level Z' for the month and determining 358 if the peak point for the first BAS load forecast 344 is greater than the shelf level Z' for the month. If the peak point for the modified second BAS load forecast 342 is equal to a shelf level Z' for the month and the peak point for the first BAS load forecast 344 is greater than the shelf level Z' for the month, then the flowchart 341 can include determining 354 if the ESS capacity is greater than the energy consumption for the first BAS load forecast 344 above the shelf level Z' for the month. If the ESS capacity is greater than the energy consumption for the first BAS load forecast 344 above the shelf level Z' for the month, then the first BAS load forecast 344 can be engaged 362 to shape the load profile of the building.

If the peak point for the modified second BAS load forecast 342 is less than a shelf level Z' for the month and the peak point for the first BAS load forecast 344 is greater than the shelf level Z' for the month, then the flowchart 341 can include determining 356 if the ESS capacity is less than the energy consumption for the first BAS load forecast 344 above the shelf level Z' for the month. If the ESS capacity is greater than the energy consumption for the first BAS load forecast 344 above the shelf level Z', then the second BAS load forecast 342 can be engaged 364 to shape the load profile of the building.

Determining which BAS load forecast to utilize to shape the load of a building can include determining 360 if the peak point for the modified second BAS load forecast 342 is equal to a shelf level Z' for the month and determining 360 if the peak point for the first BAS load forecast 344 is less than the shelf level Z' for the month. If the peak point for the modified second BAS load forecast 342 is equal to a shelf level Z' for the month and the peak point for the first BAS load forecast 344 is less than the shelf level Z' for the month, then the first BAS load forecast 344 can be engaged 362 to shape the load profile of a building.

Figure 4:
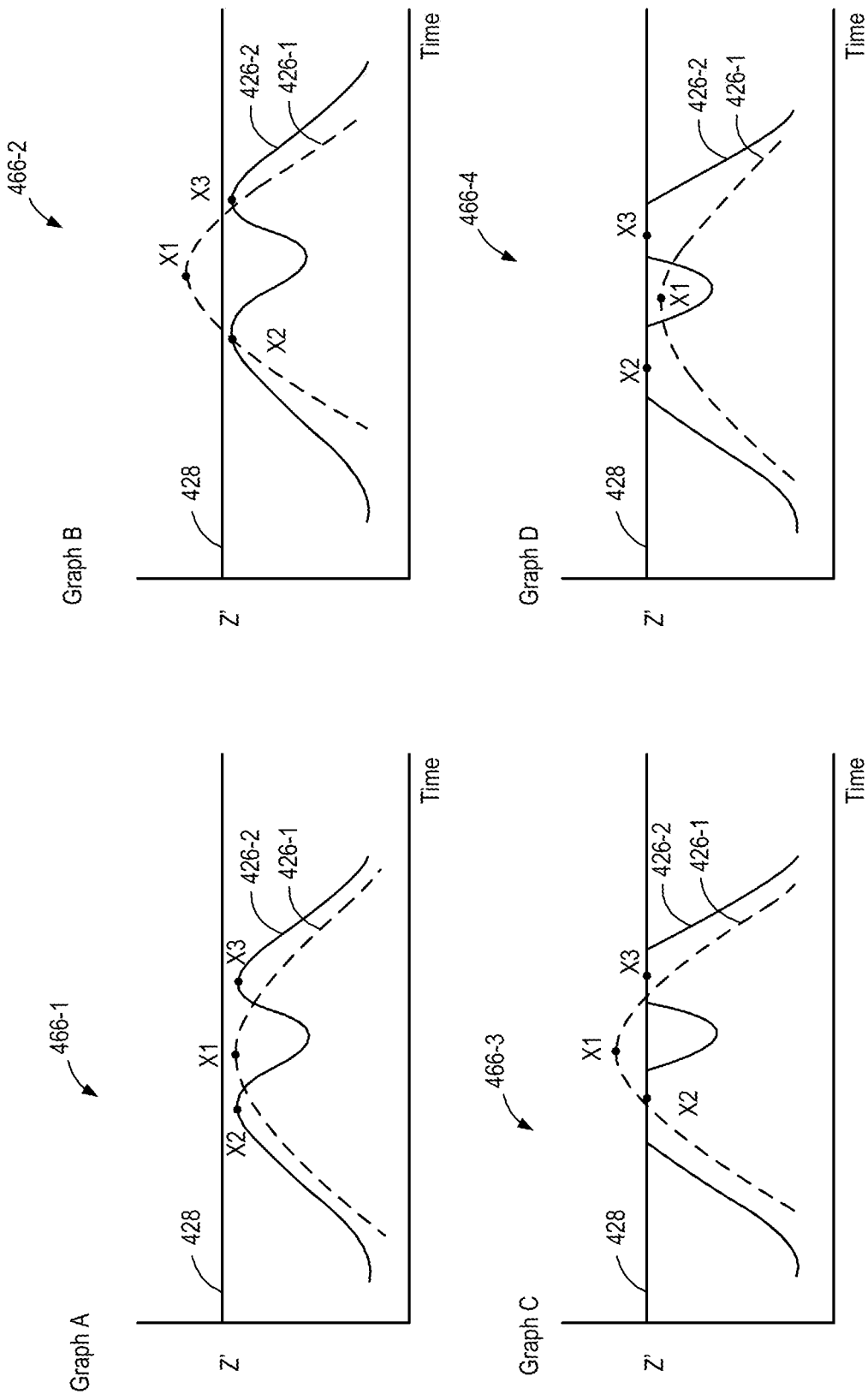
FIG. 4 is a diagram of a plurality of load profiles according to one embodiment.

FIG. 4 is a diagram of a plurality of load profiles according to one embodiment. FIG. 4 shows a load profile 466-1, a load profile 466-2, a load profile 466-3, and a load profile 466-4. The load profile 466-1 is shown as graph A. The load profile 466-2 is shown as graph B. The load profile 466-3 is shown as graph C. The load profile 466-4 is shown as graph D. FIG. 4 also shows a first BAS load forecast 426-1, a second BAS load forecast 426-2, and a shelf level Z' 428.

The load profile 466-1 corresponds to a determination 350 in FIG. 3 that the peak point (e.g., X2 and/or X3) for the modified second BAS load forecast 426-2 is less than a shelf level Z' 428 for the month and a determination 350 that the peak point X1 for the first BAS load forecast 344 is less than the shelf level Z' 428 for the month. The load profile 466-2 corresponds to a determination 352 in FIG. 3 that the peak point (e.g., X2 and/or X3) for the modified second BAS load forecast 426-2 is less than a shelf level Z' 428 for the month and a determination 352 that the peak point X1 for the first BAS load forecast 344 is greater than the shelf level Z' 428 for the month.

The load profile 466-3 corresponds to a determination 358 in FIG. 3 that the peak point (e.g., X2 and/or X3) for the modified second BAS load forecast 426-2 is equal to a shelf level Z' 428 for the month and a determination 358 that the peak point X1 for the first BAS load forecast 344 is greater than the shelf level Z' 428 for the month. The load profile 466-4 corresponds to a determination 360 in FIG. 3 that the peak point (e.g., X2 and/or X3) for the modified second BAS load forecast 426-2 is equal to a shelf level Z' 428 for the month and a determination 358 that the peak point X1 for the first BAS load forecast 344 is less than the shelf level Z' 428 for the month.

Figure 5:
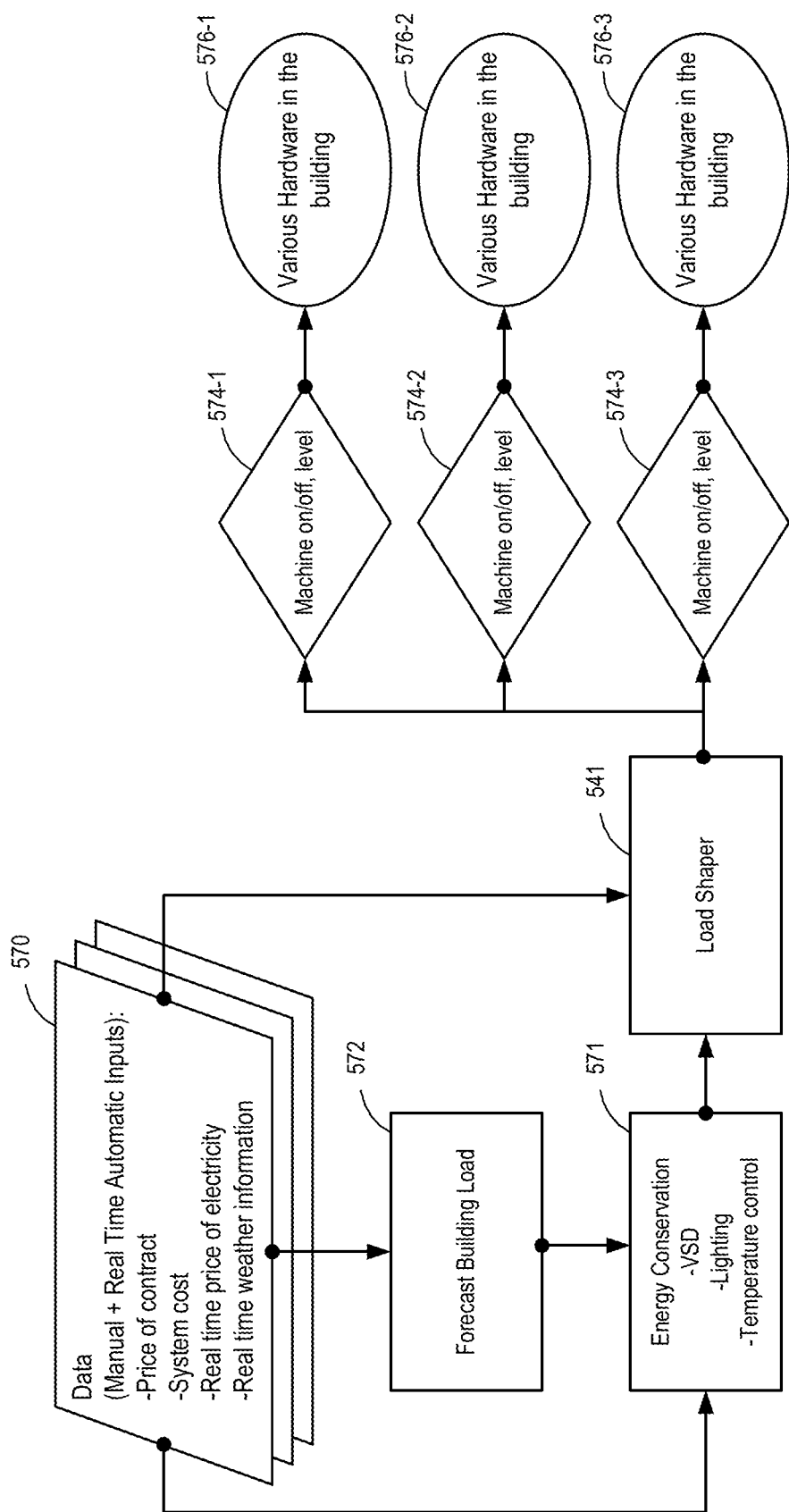
FIG. 5 is a flowchart of a building automation software according to one embodiment.

FIG. 5 is a flowchart of a BAS according to one embodiment. FIG. 5 shows a load shaper 541. In some examples, the load shaper 541 can be part of the BAS as shown in FIG. 5. In other examples, the load shaper 541 can be external to the BAS as shown in FIG. 1.

The BAS can receive a variety of data 570 (e.g., various inputs). The data 570 can be provided to the BAS manually or in real time automation. The data 570 can include, for example, the price of a contract, the system cost, the real time price of electricity, and real time weather information.

The BAS can generate a forecast of a building load 572 (e.g., BAS load forecast 572). The BAS load forecast 572 can be modified based on the energy conservation module 571. The energy conservation module 572 can employ a plurality of conservation strategies include strategies associated with a variable speed drive (VSD), lighting, and/or temperature control, for example. The modified BAS load forecast 572 can be provided to a load shaper 541. The load shaper 541 can further modify the BAS load forecast 572 by implementing a plurality of conditions described above.

The BAS can interface with a building management system to accentuate a plurality of controls 574-1, 574-2, and 574-3, referred to generally as controls 574. The controls 574 can correspond with an on value, an off value, and/or a level value of a specific machine, system, and/or object to control the various hardware 576-1, 576-2, and/or 576-3 in the building.

Figure 6:
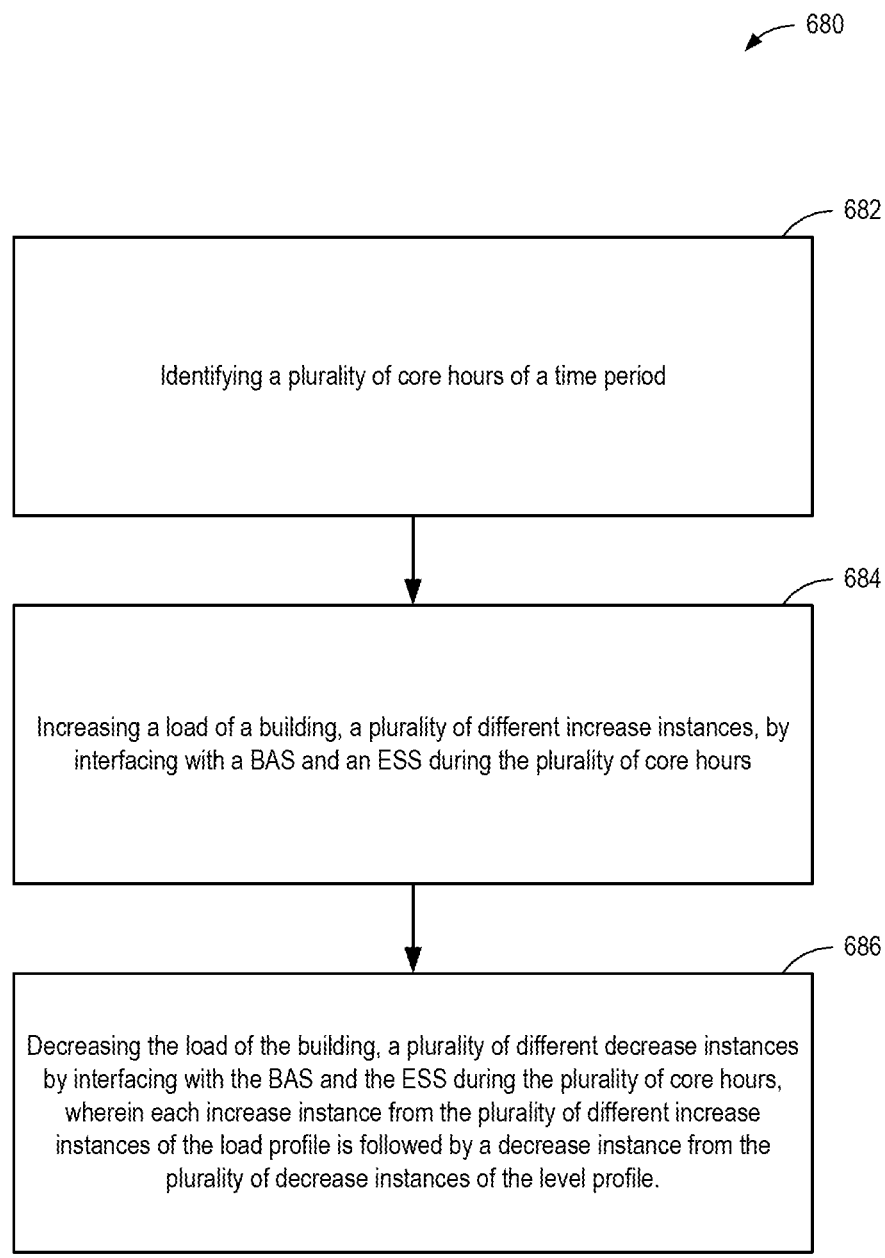
FIG. 6 is a flowchart of a method for shaping the load profile of a building according to one embodiment.

FIG. 6 is a flowchart of a method 680 for shaping the load profile of a building according to one embodiment. The method 680 can include identifying 682 a plurality of core hours of a time period; increasing 684 a load of the building, a plurality of different increase instances, by interfacing with a BAS and an ESS during the plurality of core hours; and decreasing 686 the load of the building, a plurality of different decrease instances, by interfacing with the BAS and the ESS during the plurality of core hours, wherein each increase instance from the plurality of different increase instances of the load profile is followed by a decrease instance from the plurality of decrease instances of the load profile.

In some examples, the load profile can comprise two or more peaks during the core hours. Each of the two or more peaks of the load profile can be defined by the intersection of an increase instance and a decrease instance of the load profile. Each of the two or more peaks of the load profile can comprise an increase instance from the plurality of different increase instances followed by a decrease instance from the plurality of different decrease instances.

The method 680 can further comprise determining a shelf level of a storage device coupled to the ESS, wherein the shelf level defines a point in the load profile at which the storage device discharges to support the load of the building. The method 680 can also comprise discharging the storage device at least two separate discharge instances, wherein each discharge instance from the at least two separate discharge instances occurs between the shelf level of a storage device including a peak from the two or more peaks. The method 680 can further comprise charging the storage device at least on three separate discharge instances, wherein at least a discharge instance from the separate discharge instances occurs between the shelf level and between two peaks from the two or more peaks.

Figure 7:
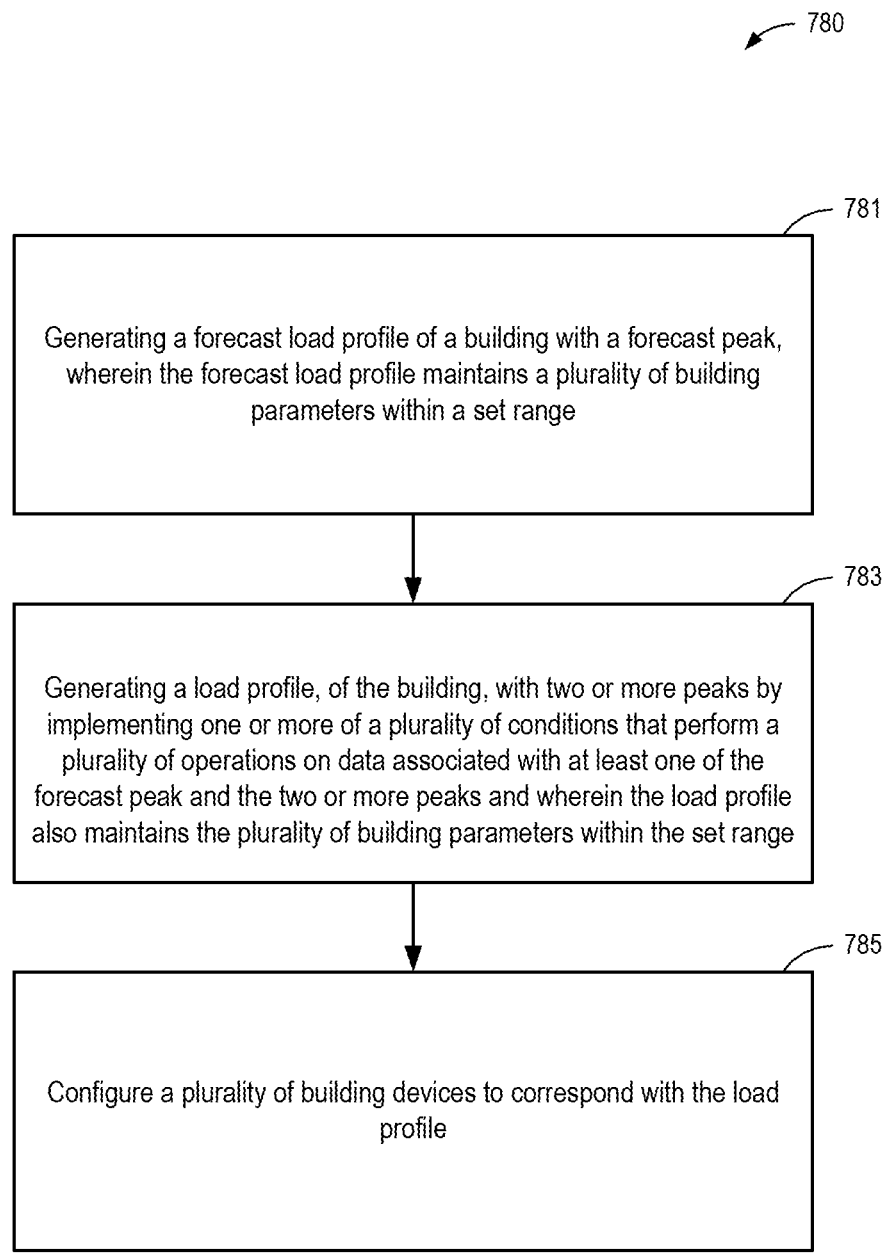
FIG. 7 is a flowchart of a method for shaping the load profile of a building according to one embodiment.

FIG. 7 is a flowchart of a method 780 for shaping the load profile of a building according to one embodiment. The method 780 comprises generating 781 a forecast load profile of a building with a forecast peak, wherein the forecast load profile maintains a plurality of building parameters within a set range; generating 783 a load profile of the building with two or more peaks by implementing one or more of a plurality of conditions that perform a plurality of operations on data associated with at least one of the forecast peak and the two or more peaks and wherein the load profile also maintains the plurality of building parameters within the set range; and configuring 785 a plurality of building devices to correspond with the load profile.

The plurality of operations can include minimizing an energy used in the load profile at a point corresponding to a forecast peak point of the forecast peak. The plurality of operations can include minimizing the width of the two or more peaks. The plurality of operations can also include maximizing a result of subtracting a forecast dispatch potential of the forecast load profile from a difference between a dispatch potential of the load profile and a recharge potential of the load profile minus. The plurality of operations can further include determining that a total energy used in the load profile is less than a forecast total energy used in the forecast load profile.

Figure 8:
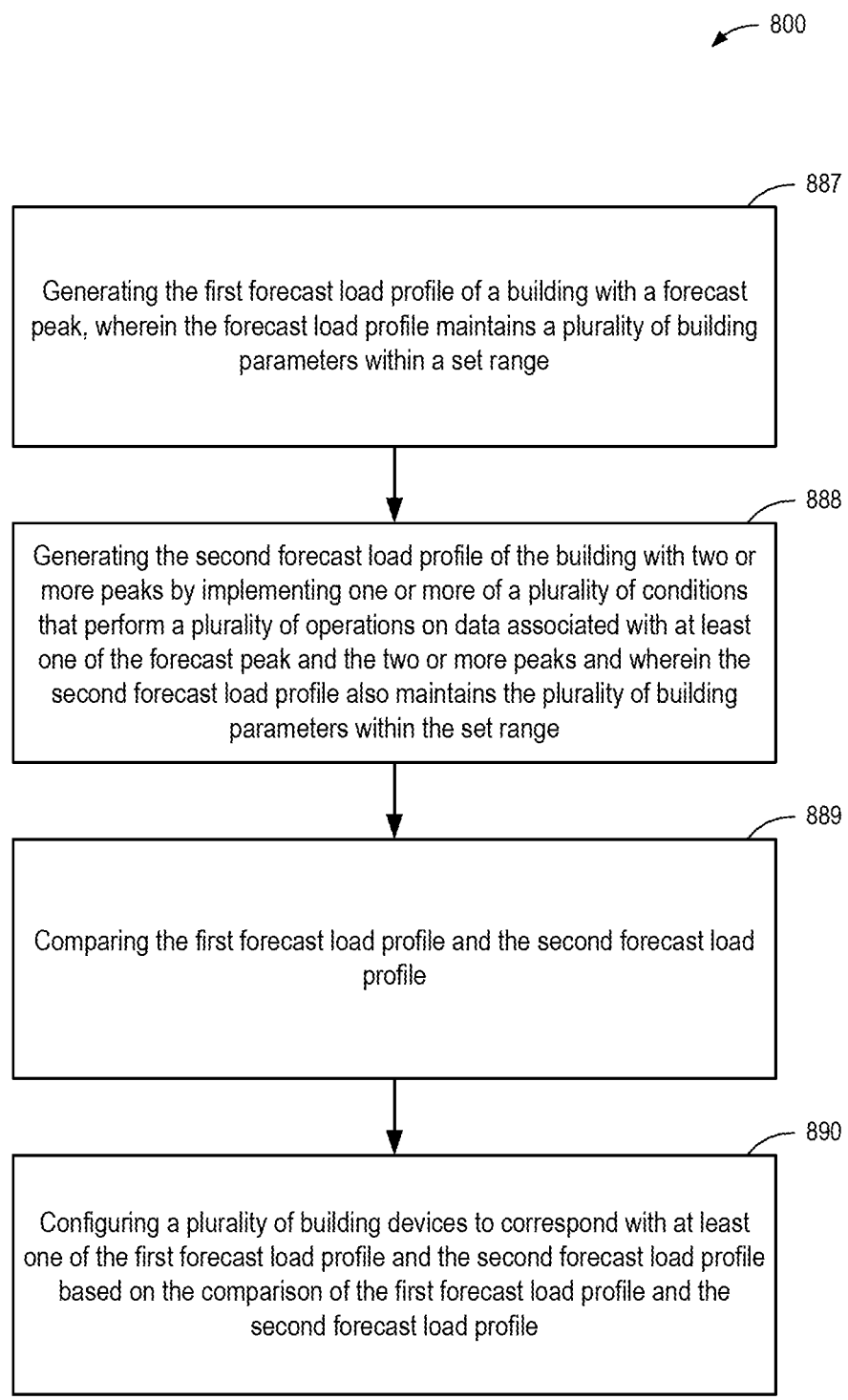
FIG. 8 is a flowchart of a method for shaping the load profile of a building according to one embodiment.

FIG. 8 is a flowchart of a method 880 for shaping the load profile of a building according to one embodiment. The method 880 comprises generating 887 the first forecast load profile of a building with a forecast peak, wherein the forecast load profile maintains a plurality of building parameters within a set range; generating 888 the second forecast load profile of the building with two or more peaks by implementing one or more of a plurality of conditions that perform a plurality of operations on data associated with at least one of the forecast peak and the two or more peaks and wherein the second forecast load profile also maintains the plurality of building parameters within the set range; comparing 889 the first forecast load profile and the second forecast load profile; and configuring 890 a plurality of building devices to correspond with at least one of the first forecast load profile and the second forecast load profile based on the comparison of the first forecast load profile and the second forecast load profile.

The method 880 can further comprise configuring the plurality of building devices to correspond with the first forecast load profile based on a determination that the two or more peaks are less than a shelf level of the second forecast load profile and the forecast peak is less than the shelf level of the second forecast load profile. The method 880 can also comprise configuring the plurality of building devices to correspond with the first forecast load profile based on a determination that the two or more peaks are less than a shelf level of the second forecast load profile, the forecast peak is greater than the shelf level of the second forecast load profile, and an ESS capacity is greater than an energy consumption, above the shelf level of the second forecast load profile, of the first forecast load profile.

The method 880 can also comprise configuring the plurality of building devices to correspond with the second forecast load profile based on a determination that the two or more peaks are less than a shelf level of the second forecast load profile, the forecast peak is greater than the shelf level of the second forecast load profile, and an ESS capacity is less than an energy consumption, above the shelf level of the second forecast load profile, of the first forecast load profile. The method 880 can further comprise configuring the plurality of building devices to correspond with the first forecast load profile based on a determination that the two or more peaks are equal to a shelf level of the second forecast load profile, the forecast peak is greater than the shelf level of the second forecast load profile, and the ESS capacity is greater than an energy consumption, above the shelf level of the second forecast load profile, of the first forecast load profile.

The method 880 can also comprise configuring the plurality of building devices to correspond with the second forecast load profile based on a determination that the two or more peaks are equal to a shelf level of the second forecast load profile, the forecast peak is greater than the shelf level of the second forecast load profile, and an ESS capacity is less than an energy consumption, above the shelf level of the second forecast load profile, of the first forecast load profile. The method 880 can further comprise configuring the plurality of building devices to correspond with the first forecast load profile based on a determination that the two or more peaks are equal to a shelf level of the second forecast load profile and the forecast peak is less than the shelf level of the second forecast load profile.

Figure 9:
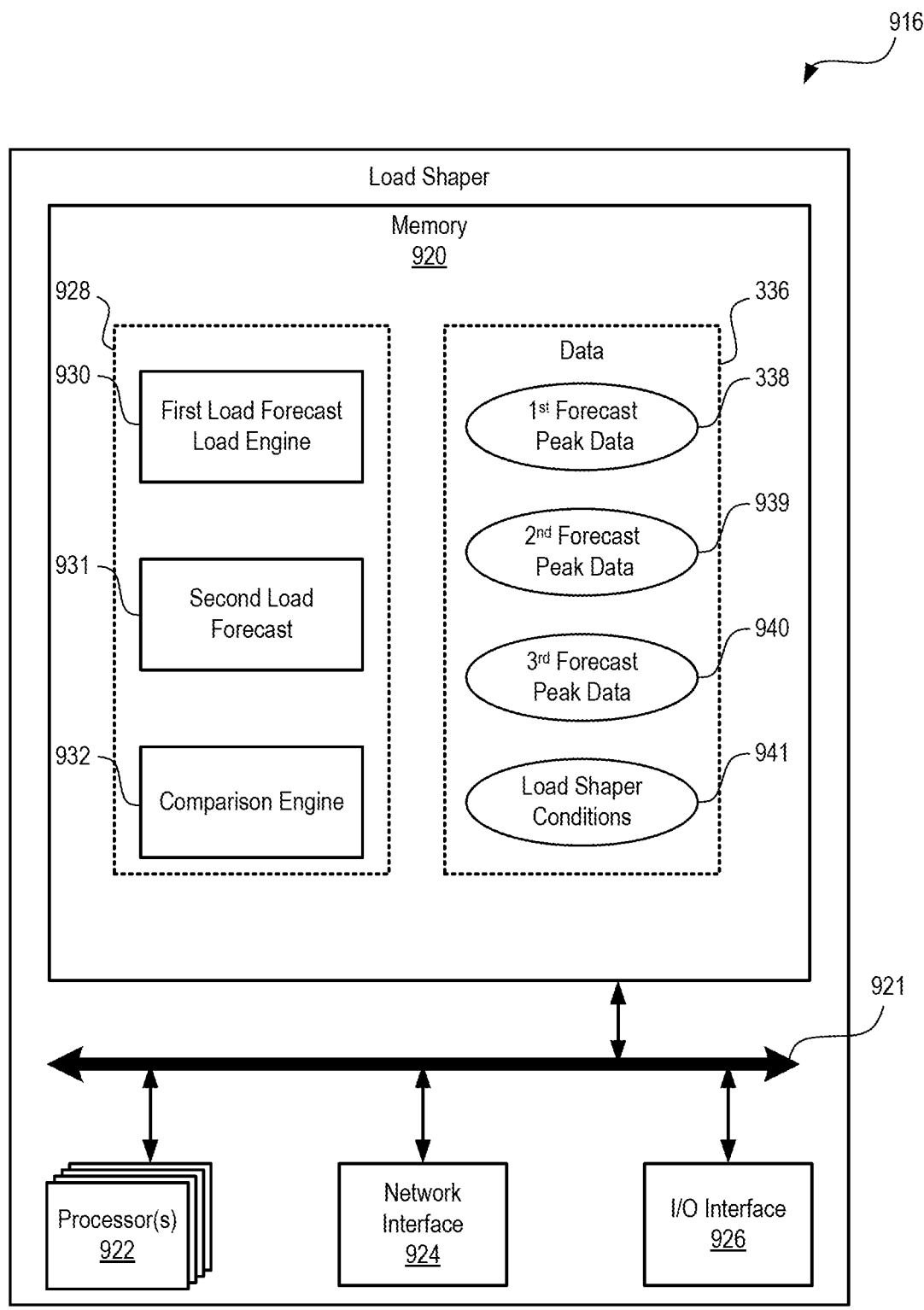
FIG. 9 is a block diagram of a load shaper according to one embodiment.

FIG. 9 is a block diagram of a load shaper 916 according to one embodiment. The load shaper 916 can include a memory 920, one or more processors 922, a network interface 924, an input/output interface 926, and a system bus 921. The load shaper 916 may be the same as or analogous to the load shaper 116 in FIG. 1.

The one or more processors 922 may include one or more general purpose devices, such as an Intel®, AMD®, or other standard microprocessor. The one or more processors 922 may include a special purpose processing device, such as ASIC, SoC, SiP, FPGA, PAL, PLA, FPLA, PLD, or other customized or programmable device. The one or more processors 922 can perform distributed (e.g., parallel) processing to execute or otherwise implement functionalities of the presently disclosed embodiments. The one or more processors 922 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 920 may include static RAM, dynamic RAM, flash memory, one or more flip-flops, ROM, CD-ROM, DVD, disk, tape, or magnetic, optical, or other computer storage medium. The memory 920 may include a plurality of program modules 928 and program data 936. The memory 920 may be local to the load shaper 916, as shown, or may be distributed and/or remote relative to the load shaper 916.

The program modules 928 may include all or portions of other elements of the load shaper 916 and/or the flowchart 341 in FIG. 3. The program modules 928 may run multiple operations concurrently or in parallel by or on the one or more processors 922. In some embodiments, portions of the disclosed modules, components, and/or facilities are embodied as executable instructions embodied in hardware or in firmware, or stored on a non-transitory, machine-readable storage medium, such as the memory 920. The instructions may comprise computer program code that, when executed by a processor and/or computing device, cause a computing system (such as the processors 922 and/or the load shaper 916) to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 920 may also include the program data 936. Data generated by the load shaper 916, such as by the program modules 928 or other modules, may be stored on the memory 920, for example, as stored program data 936. The stored program data 936 may be organized as one or more databases. In certain embodiments, the program data 936 may be stored in a database system. The database system may reside within the memory 920. In other embodiments, the program data 936 may be remote, such as in a distributed computing and/or storage environment. For example, the program data 936 may be stored in a database system on a remote computing device.

The input/output interface 926 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 924 may facilitate communication with other computing devices and/or networks such as the networks 122-1 and 122-2 in FIG. 1 and/or other computing and/or communications networks. The network interface 924 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 924 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 921 may facilitate communication and/or interaction between the other components of the system, including the one or more processors 922, the memory 920, the input/output interface 926, and the network interface 924.

As noted, the load shaper 916 also includes various program modules 928 (or engines, elements, or components) to implement functionalities of the load shaper 916, including a first load forecast engine 930, a second load forecast engine 931, and/or a comparison engine 932. These elements may be embodied, for example, at least partially in the program modules 928. In other embodiments, these elements may be embodied or otherwise implemented in hardware of the load shaper 916. The load shaper 916 also includes a first forecast peak data 938, a second forecast peak data 939, and/or a load shaper conditions 941 that may be stored in the program data 936 which may be generated, accessed, and/or manipulated by the program modules 928.

The first load forecast engine 930 is configured to generate a first load forecast comprising the first forecast peak data 938. The second load forecast engine 930 is also configured to receive at least the load shaper conditions 941 to generate a second load forecast comprising the second forecast peak data 939. The comparison engine 932 can compare the first forecast peak data 938 of the first load forecast and the second forecast peak data 939 of the second load forecast to determine which load forecast to use to shape the load of a building.

The first forecast peak data 938 can comprise, for example, data associated with a peak point, a width, a dispatch potential, a recharge potential, and/or total energy used by a first load forecast. The first forecast peak data 938 can also comprise a shelf level of the first load forecast. The second forecast peak data 939 can also comprise data associated with a peak point, a width, a dispatch potential, a recharge potential, and/or total energy used by a second load forecast. The second forecast peak data 939 can also comprise a shelf level of the second load forecast. The load shaper conditions 941 can comprise conditions provided by a load shaper as described above.

EXAMPLE EMBODIMENTS

Some examples of embodiments of communication systems and methods are provided below.

Example 1 is a method for shaping a load profile of a building. The method includes identifying a variety of core hours of a time period. The method includes increasing a load of the building, a variety of different increase instances, by interfacing with a building automation system (BAS) and an energy storage system (ESS) during the variety of core hours. The method also includes decreasing the load of the building, a variety of different decrease instances, by interfacing with the BAS and the ESS during the variety of core hours, where each increase instance from the variety of different increase instances of the load profile is followed by a decrease instance from the variety of decrease instances of the load profile.

Example 2 is the method of Example 1, where the load profile includes two or more peaks during the core hours.

Example 3 is the method of Example 2, where each of the two or more peaks of the load profile is defined by the intersection of an increase instance and a decrease instance of the load profile.

Example 4 is the method of Example 2, where each of the two or more peaks of the load profile includes an increase instance from the variety of different increase instances followed by a decrease instance from the variety of different decrease instances.

Example 5 is the method of Example 1, where the method further includes determining a shelf level of a storage device attached to the ESS, where the shelf level defines a point in the load profile at which the storage device discharges to support the load of the building.

Example 6 is a computer-readable storage medium having stored thereon instructions that, when implemented by a computing device, cause the computing device to generate a forecast load profile of a building with a forecast peak, where the forecast load profile maintains a variety of building parameters within a set range. The computer-readable storage medium having stored thereon instructions that, when implemented by a computing device, cause the computing device to further generate a load profile, of the building, with two or more peaks by implementing one or more of a variety of conditions that perform a variety of operations on data associated with at least one of the forecast peak and the two or more peaks and where the load profile also maintains the variety of building parameters within the set range and design a variety of building devices to correspond with the load profile.

Example 7 is the computer-readable storage medium of Example 6, where the variety of operations include minimizing an energy used in the load profile at a point corresponding to a forecast peak point of the forecast peak.

Example 8 is the computer-readable storage medium of Example 6, where the variety of operations include minimizing the width of the two or more peaks.

Example 9 is the computer-readable storage medium of Example 8, where the variety of operations include maximizing a result of subtracting a forecast dispatch potential of the forecast load profile from a difference between a dispatch potential of the load profile and a recharge potential of the load profile minus.

Example 10 is the computer-readable storage medium of Example 9, where the variety of operations include determining that a total energy used in the load profile is less than a forecast total energy used in the forecast load profile.

Example 11 is a load shaper device for shaping a load profile. The load shaper devices includes memory designed to store a first forecast load profile and a second forecast load profile. At one or more processing units are designed to generate the first forecast load profile of a building with a forecast peak, where the forecast load profile maintains a variety of building parameters within a set range. At one or more processing units are also designed to generate the second forecast load profile of the building with two or more peaks by implementing one or more of a variety of conditions that perform a variety of operations on data associated with at least one of the forecast peak and the two or more peaks and where the second forecast load profile also maintains the variety of building parameters within the set range. The ranges compares the first forecast load profile and the second forecast load profile and design a variety of building devices to correspond with at least one of the first forecast load profile and the second forecast load profile based on the comparison of the first forecast load profile and the second forecast load profile.

Example 12 is the load shaper device of Example 11, where the one or more processing units are designed to design the variety of building devices to correspond with the first forecast load profile based on a determination that the two or more peaks are less than a shelf level of the second forecast load profile, and the forecast peak is less than the shelf level of the second forecast load profile.

Example 13 is the load shaper device of Example 11, where the one or more processing units are designed to design the variety of building devices to correspond with the first forecast load profile based on a determination that; the two or more peaks are less than a shelf level of the second forecast load profile, the forecast peak is greater than the shelf level of the second forecast load profile, and an energy storage system (ESS) capacity is greater than an energy consumption, above the shelf level of the second forecast load profile, of the first forecast load profile.

Example 14 is the load shaper device of Example 11, where the one or more processing units are designed to design the variety of building devices to correspond with the second forecast load profile based on a determination that; the two or more peaks are less than a shelf level of the second forecast load profile, the forecast peak is greater than the shelf level of the second forecast load profile, and an energy storage system (ESS) capacity is less than an energy consumption, above the shelf level of the second forecast load profile, of the first forecast load profile.

Example 15 is the load shaper device of Example 11, where the one or more processing units are designed to design the variety of building devices to correspond with the first forecast load profile based on a determination that; the two or more peaks are equal to a shelf level of the second forecast load profile, the forecast peak is greater than the shelf level of the second forecast load profile, and an energy storage system (ESS) capacity is greater than an energy consumption, above the shelf level of the second forecast load profile, of the first forecast load profile.

Example 16 is the load shaper device of Example 11, where the one or more processing units are designed to design the variety of building devices to correspond with the second forecast load profile based on a determination that; the two or more peaks are equal to a shelf level of the second forecast load profile, the forecast peak is greater than the shelf level of the second forecast load profile, and an energy storage system (ESS) capacity is less than an energy consumption, above the shelf level of the second forecast load profile, of the first forecast load profile.

Example 17 is the load shaper device of Example 11, where the one or more processing units are designed to design the variety of building devices to correspond with the first forecast load profile based on a determination that; the two or more peaks are equal to a shelf level of the second forecast load profile, and the forecast peak is less than the shelf level of the second forecast load profile.

Example 18 is a method including generating a forecast load profile of a building with a forecast peak, where the forecast load profile maintains a variety of building parameters within a set range. The method includes generating a load profile, of the building, with two or more peaks by implementing one or more of a variety of conditions that perform a variety of operations on data associated with at least one of the forecast peak and the two or more peaks and where the load profile also maintains the variety of building parameters within the set range. The method also includes configuring a variety of building devices to correspond with the load profile.

Example 19 is the method of Example 18, where the variety of operations include minimizing an energy used in the load profile at a point corresponding to a forecast peak point of the forecast peak.

Example 20 is the method of Example 18, where the variety of operations include minimizing the width of the two or more peaks.

Example 21 is the method of Example 20, where the variety of operations include maximizing a result of subtracting a forecast dispatch potential of the forecast load profile from a difference between a dispatch potential of the load profile and a recharge potential of the load profile minus.

Example 22 is the method of Example 21, where the variety of operations include determining that a total energy used in the load profile is less than a forecast total energy used in the forecast load profile.

Example 23 is a method including generating the first forecast load profile of a building with a forecast peak, where the forecast load profile maintains a variety of building parameters within a set range. The method includes generating the second forecast load profile of the building with two or more peaks by implementing one or more of a variety of conditions that perform a variety of operations on data associated with at least one of the forecast peak and the two or more peaks and where the second forecast load profile also maintains the variety of building parameters within the set range. The ranges compares the first forecast load profile and the second forecast load profile and configuring a variety of building devices to correspond with at least one of the first forecast load profile and the second forecast load profile based on the comparison of the first forecast load profile and the second forecast load profile.

Example 24 is the method of Example 23, further including configuring the variety of building devices to correspond with the first forecast load profile based on a determination that; the two or more peaks are less than a shelf level of the second forecast load profile, and the forecast peak is less than the shelf level of the second forecast load profile.

Example 25 is the method of Example 23, further including configuring the variety of building devices to correspond with the first forecast load profile based on a determination that; the two or more peaks are less than a shelf level of the second forecast load profile, the forecast peak is greater than the shelf level of the second forecast load profile, and an energy storage system (ESS) capacity is greater than an energy consumption, above the shelf level of the second forecast load profile, of the first forecast load profile.

Example 26 is the method of Example 23, further including configuring the variety of building devices to correspond with the second forecast load profile based on a determination that; the two or more peaks are less than a shelf level of the second forecast load profile, the forecast peak is greater than the shelf level of the second forecast load profile, and an energy storage system (ESS) capacity is less than an energy consumption, above the shelf level of the second forecast load profile, of the first forecast load profile.

Example 27 is the method of Example 23, further including configuring the variety of building devices to correspond with the first forecast load profile based on a determination that; the two or more peaks are equal to a shelf level of the second forecast load profile, the forecast peak is greater than the shelf level of the second forecast load profile, and an energy storage system (ESS) capacity is greater than an energy consumption, above the shelf level of the second forecast load profile, of the first forecast load profile.

Example 28 is the method of Example 23, further including configuring the variety of building devices to correspond with the second forecast load profile based on a determination that; the two or more peaks are equal to a shelf level of the second forecast load profile, the forecast peak is greater than the shelf level of the second forecast load profile, and an energy storage system (ESS) capacity is less than an energy consumption, above the shelf level of the second forecast load profile, of the first forecast load profile.

Example 29 is the method of Example 23, further including configuring the variety of building devices to correspond with the first forecast load profile based on a determination that; the two or more peaks are equal to a shelf level of the second forecast load profile, and the forecast peak is less than the shelf level of the second forecast load profile.

In Example 30 at least one computer-readable storage medium having stored thereon computer-readable instructions, when executed, to implement a method as exemplified in any of Examples 1-5 and 18-29.

Example 31 is an apparatus including manners to perform a method as exemplified in any of Examples 1-5 and 18-29. Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

What is claimed is:

1. A method for shaping a load profile of a building, comprising:
    identifying a plurality of core hours of a time period;
    increasing a load of the building, a plurality of different increase instances, by interfacing with a building automation system (BAS) and an energy storage system (ESS) during the plurality of core hours, wherein the ESS comprises a battery; and
    decreasing the load of the building, a plurality of different decrease instances, by interfacing with the BAS and the ESS during the plurality of core hours, wherein decreasing the load of the building comprises curtailing, via the BAS, equipment loads contributing to the load of the building to transition a single peak in the load profile to multiple narrower peaks,
    wherein the multiple narrower peaks are created from the single peak by the BAS decreasing the load of the building during one or more portions of a period of time associated with the single peak to create one or more valleys during one or more portions of a period of time associated with the single peak,
    wherein a shape of each of the multiple narrower peaks is chosen by:
        minimizing energy use at a peak point of the single peak,
        minimizing the width of each of multiple narrower peaks, and maximizing x=discharge potential [A]−((discharge potential [B1+B2])−recharge potential [C]),
where discharge potential [A] is a discharge potential associated with the single peak, discharge potential [B1+B2] is a discharge potential of the multiple narrower peaks, and recharge potential [C] is a charge potential associated corresponding to generating the multiple narrower peaks; and
discharging the battery for peak shaving of the multiple narrower peaks,
wherein each increase instance from the plurality of different increase instances of the load profile is followed by a decrease instance from the plurality of decrease instances of the load profile.

2. The method of claim 1, wherein the load profile comprises two or more peaks during the core hours.

3. The method of claim 2, wherein each of the two or more peaks of the load profile is defined by the intersection of an increase instance and a decrease instance of the load profile.

4. The method of claim 2, wherein each of the two or more peaks of the load profile comprises an increase instance from the plurality of different increase instances followed by a decrease instance from the plurality of different decrease instances.

5. The method as in claim 1, 2, 3, or 4, wherein the method further comprises determining a shelf level of a storage device coupled to the ESS, wherein the shelf level defines a point in the load profile at which the storage device discharges to support the load of the building.

6. A non-transitory computer-readable storage medium having stored thereon instructions that, when implemented by a computing device, cause the computing device to:
generate a forecast load profile of a building with a forecast peak, wherein the forecast load profile maintains a plurality of building parameters within a set range;
generate a load profile, of the building, with two or more peaks to transition the forecast peak to multiple narrower peaks for peak shaving by discharging a battery, the load profile is generated by implementing one or more of a plurality of conditions that perform a plurality of operations on data associated with at least one of the forecast peak and the two or more peaks and wherein the load profile also maintains the plurality of building parameters within the set range, wherein the two or more peaks are created by curtailing equipment loads contributing to the load profile based on the one or more of a plurality of conditions to create a valley in the load profile,
wherein the multiple narrower peaks are created from the forecast peak by decreasing the equipment loads contributing to the load profile during one or more portions of a period of time associated with the forecast peak to create one or more valleys within the load profile at the period of time associated with the forecast peak
wherein a shape of each of the multiple narrower peaks are generated by:
minimizing energy use a peak point of the forecast peak,
minimizing the width of each of multiple narrower peaks, and
maximizing discharge potential [A]−((discharge potential [B1+B2])−recharge potential [C]),
where discharge potential [A] is a discharge potential associated with the forecast peak, discharge potential [B1+B2] is a discharge potential of the multiple narrower peaks, and recharge potential [C] is a recharge potential corresponding to generating the multiple narrower peaks; and
configure a plurality of building devices to correspond with the load profile.

7. The computer-readable storage medium of claim 6, wherein the plurality of operations include minimizing an energy used in the load profile at a point corresponding to a forecast peak point of the forecast peak.

8. The computer-readable storage medium as in claim 6 or 7, wherein the plurality of operations include minimizing the width of the two or more peaks.

9. The computer-readable storage medium of claim 8, wherein the plurality of operations include maximizing a result of subtracting a forecast dispatch potential of the forecast load profile from a difference between a dispatch potential of the load profile and a recharge potential of the load profile.

10. The computer-readable storage medium of claim 9, wherein the plurality of operations include determining that a total energy used in the load profile is less than a forecast total energy used in the forecast load profile.

11. A load shaper device for shaping a load profile, comprising:
memory configured to store a first forecast load profile and a second forecast load profile;
at one or more processing units configured to:
generate the first forecast load profile of a building with a forecast peak, wherein the forecast load profile maintains a plurality of building parameters within a set range;
generate the second forecast load profile of the building with two or more peaks to transition the forecast peak to multiple narrower peaks for peak shaving by discharging a battery, the second forecast load profile is generated by implementing one or more of a plurality of conditions that perform a plurality of operations on data associated with at least one of the forecast peak and the two or more peaks and wherein the second forecast load profile also maintains the plurality of building parameters within the set range, wherein the two or more peaks are created by curtailing equipment loads contributing to the load profile based on the one or more of a plurality of conditions to create a valley in the load profile,
wherein two or more peaks comprise the multiple narrower peaks and are created from the forecast peak by decreasing the equipment loads contributing to the load profile during one or more portions of a period of time associated with the forecast peak to create one or more valleys within the load profile at the period of time associated with the forecast peak
wherein a shape of each of the multiple narrower peaks are generated by:
minimizing energy use at a peak point of the forecast peak,
minimizing the width of each of multiple narrower peaks, and
maximizing discharge potential [A]−((discharge potential [B1+B2])−recharge Potential [C]),
where discharge potential [A] is a discharge potential associated with the forecast peak, discharge potential [B1+B2] is a discharge potential of the multiple narrower peaks, and recharge potential [C] is a recharge potential corresponding to generating the multiple narrower peaks;
compare the first forecast load profile and the second forecast load profile; and configure a plurality of building devices to correspond with at least one of the first forecast load profile and the second forecast load profile based on the comparison of the first forecast load profile and the second forecast load profile.

12. The load shaper device of claim 11, wherein the one or more processing units are configured to:
   configure the plurality of building devices to correspond with the first forecast load profile based on a determination that:
      the two or more peaks are less than a shelf level of the second forecast load profile; and
      the forecast peak is less than the shelf level of the second forecast load profile.

13. The load shaper device of claim 11, wherein the one or more processing units are configured to:
   configure the plurality of building devices to correspond with the first forecast load profile based on a determination that:
      the two or more peaks are less than a shelf level of the second forecast load profile;
      the forecast peak is greater than the shelf level of the second forecast load profile; and
      an energy storage system (ESS) capacity is greater than an energy consumption, above the shelf level of the second forecast load profile, of the first forecast load profile.

14. The load shaper device of claim 11, wherein the one or more processing units are configured to:
   configure the plurality of building devices to correspond with the second forecast load profile based on a determination that:
      the two or more peaks are less than a shelf level of the second forecast load profile;
      the forecast peak is greater than the shelf level of the second forecast load profile; and
      an energy storage system (ESS) capacity is less than an energy consumption, above the shelf level of the second forecast load profile, of the first forecast load profile.

15. The load shaper device as in claim 11, 12, 13, or 14, wherein the one or more processing units are configured to:
   configure the plurality of building devices to correspond with the first forecast load profile based on a determination that:
      the two or more peaks are equal to a shelf level of the second forecast load profile;
      the forecast peak is greater than the shelf level of the second forecast load profile; and
      an energy storage system (ESS) capacity is greater than an energy consumption, above the shelf level of the second forecast load profile, of the first forecast load profile.

16. The load shaper device as in claim 11, 12, 13, or 14, wherein the one or more processing units are configured to:
   configure the plurality of building devices to correspond with the second forecast load profile based on a determination that:
      the two or more peaks are equal to a shelf level of the second forecast load profile;
      the forecast peak is greater than the shelf level of the second forecast load profile; and
      an energy storage system (ESS) capacity is less than an energy consumption, above the shelf level of the second forecast load profile, of the first forecast load profile.

17. The load shaper device as in claim 11, 12, 13, or 14, wherein the one or more processing units are configured to:
   configure the plurality of building devices to correspond with the first forecast load profile based on a determination that:
      the two or more peaks are equal to a shelf level of the second forecast load profile; and
      the forecast peak is less than the shelf level of the second forecast load profile.

* * * * *